(12) United States Patent
Atkins et al.

(10) Patent No.: US 7,296,224 B2
(45) Date of Patent: Nov. 13, 2007

(54) METHOD FOR ASSIGNING GRAPHICAL IMAGES TO PAGES

(75) Inventors: C. Brian Atkins, Mountain View, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 435 days.

(21) Appl. No.: 10/831,436

(22) Filed: Apr. 23, 2004

(65) Prior Publication Data

US 2005/0240865 A1 Oct. 27, 2005

(51) Int. Cl.
*G06N 3/00* (2006.01)

(52) U.S. Cl. ........................ 715/517; 715/520

(58) Field of Classification Search .......... 715/517, 715/520

See application file for complete search history.

(56) References Cited

U.S. PATENT DOCUMENTS

| | | | |
|---|---|---|---|
| 6,028,603 A | * | 2/2000 | Wang et al. ............. 715/776 |
| 6,301,586 B1 | * | 10/2001 | Yang et al. ............. 707/104.1 |
| 6,453,078 B2 | * | 9/2002 | Bubie et al. ............. 382/305 |
| 6,674,472 B1 | * | 1/2004 | Tsutsui .................. 348/333.05 |
| 2002/0122067 A1 | * | 9/2002 | Geigel et al. ............. 345/788 |

* cited by examiner

*Primary Examiner*—Stephen Hong
*Assistant Examiner*—Manglesh M. Patel (57) ABSTRACT

A system and method for paginating objects, such as graphical images, within a predefined space, such as a viewable or printed page, is provided. The system and method includes substantially evenly distributing graphical images on a selected number of pages. Alternately, the system and method may determine remainders based on supplied numbers of graphical images per page and total number of pages, and redetermine and reassign depending upon the remainders, or may employ a page layout technique using scoring to establish a best layout for available graphical images and assign graphical images to pages using the page layout technique, or may determine pagination based on expected viewing conditions. The system and method may also receive specific hard page breaks establishing chapters and compute soft page breaks based on certain criteria.

32 Claims, 6 Drawing Sheets

METHOD FOR ASSIGNING GRAPHICAL IMAGES TO PAGES

BACKGROUND OF THE INVENTION

1. Field of the Invention

The present invention relates generally to the field of assigning elements, such as images, and more specifically to efficiently assigning graphical images, to pages.

2. Description of the Related Art

Computer software is currently available for a user to collect and display graphical images in a visually pleasing format. Such computer software develops what have been called photo albums, comprising a series of pages having images selected by the user and arranged in various manners. A photo album page, as the term is used herein, refers to multiple graphical images or pictures positioned on a page of fixed size. Graphical images or pictures as used herein refer to a software depiction of virtually anything, including text, such that the graphical image or picture can be considered to have a rectangular boundary. Examples of computer files of graphical images include .gif, .tiff, and .jpeg graphical representations, but can include virtually any graphical computer image having a boundary. For example, an oval shape block of text may be considered a graphical image or picture having rectangular borders touching the top, bottom, left, and right side of the oval shape block, including optional margins.

In deciding how and where to place graphical images on a photo album page, software must address various environment specific issues. For example, the number of pictures on the page, the size of the pictures relative to each other, spatial distribution of pictures, available empty space, and the existence of captions all factor into the placement of the selected graphical images on the photo album page.

Automated placement of images on a series of pages may be considered a two step process. First, the images may be divided into various pages, typically more than one page, a process commonly called "pagination." Second, the system may determine a layout for each page, where the system assigns an absolute size for each image and a position on the page for the image. This second step, layout determination, is addressed in currently co-pending U.S. patent application Ser. Nos. 10/675,724, "Automatic Photo Album Page Layout," inventor C. Brian Atkins, and 10/675,823, "Single Pass Automatic Photo Album Page Layout," inventor C. Brian Atkins, both filed on Sep. 30, 2003, and assigned to the assignee of the present application.

The need exists for efficiently and practically enabling a user to divide images into groups of images to be printed or displayed on separate pages or regions. A user's ability to freely alter the pagination parameters is generally beneficial. Users frequently view a proposed pagination and/or layout and believe that another arrangement may be more aesthetically pleasing, for example highlighting one image more than others on a given page. Most previous systems enable the user to select the number of images to be placed on each page. Beginning at the first page, these previous solutions assign the prescribed number of images to each page until all images are exhausted. Control over the number of pages is highly indirect, and the last page may include a sub-optimal number of images. If a different number of pages is required, the user must restart the process and either add or remove images until the number of pages matches the desired page quantity, or revises the indication of the number of images on each page.

Alternately, the user may be offered sizing choices, such as "small," "medium," or "large," where small indicates, for example, 5 to 9 photos per page, medium between 3 and 6 and large between 2 and 4 photos per page. The user may also be offered a page layout template for each page, where the number of "holes" in the template provides the number of photos per page. Users may also specify numbers of rows and columns or absolute photo sizes using prior solutions, where such an arrangement provides a direct correlation between the specified attribute and the number of images on each page. In the event the user prefers to specify the number of pages, rather than the number of photos per page, each of these previous solutions either mandate computation and backsolving on the part of the user, or offer a fixed, generally immutable solution, each having a tendency to dissuade the user from using the pagination feature altogether.

Certain solutions to automatic pagination are included in, for example, Kodak Memory Albums version 1.4.64 (2001); Kodak Easy Share version 2.1.0.55 (2002); HP Photo Printing version 3.7.0.3 (2001); Adobe Photoshop Album version 1.0 (2003); and certain solutions provided via the Internet, such as myPublisher.com and Sony Image Station.

Further problems with the foregoing solution include the photo grouping desires of the user and inability of prior solutions to meet user expectations. For example, a user may desire to have ten photos from a camping trip on one or two pages, two photos of a child on another page, and twenty three pictures from a holiday event on still another page or group of pages. Simply dividing these logically grouped photo sets into arbitrary groups of two, five, or any other fixed quantity may not satisfy the user. Some users may simply want to incur the lowest costs possible, and desire printing all photos on a single page. The aforementioned solutions solve none of these issues without significant effort on the part of the user or other individual, such as a retail employee interfacing with the user.

It would therefore be desirable to offer a solution to paginating graphical images on a page or display efficiently, with varying choices made available to the user depending on user desires, while at the same time minimizing drawbacks associated with previous pagination solutions.

SUMMARY OF THE INVENTION

According to a first aspect of the present invention, there is provided method for assigning a total quantity of graphical images in an image list to a total quantity of pages. The method comprises allocating a first quantity of graphical images to each page of a first quantity of pages, and allocating a second quantity of graphical images, the second quantity of graphical images being one more image than the first quantity of graphical images, to each page of a second quantity of pages.

According to a second aspect of the present invention, there is provided method of assigning graphical images to a plurality of pages. The method comprises enabling a user to establish a desired number of graphical images per page for an image list comprising a quantity of graphical images, determining a number of pages, determining an adjusted number of graphical images per page using the number of pages, determining a remainder representing a difference between the quantity of graphical images and the adjusted number of graphical images per page multiplied by the number of pages, and assigning a remaining number of graphical images per page to each of a final quantity of pages, the remaining number of graphical images per page based on the adjusted number of graphical images per page and the final quantity of pages based on the remainder.

According to a third aspect of the present invention, there is provided a method for assigning a number of graphical images to a plurality of pages. The method comprises establishing a desired number of graphical images per page, wherein the desired number of graphical images per page may represent a range of desired graphical images per page, providing a quantity of graphical images equal to the desired number of graphical images per page to a page layout technique having a scoring functionality, the page layout technique determining a best score arrangement of graphical images, the best score arrangement of graphical images equating to a desired page layout of a first quantity of graphical images, assigning the first quantity of graphical images from the number of graphical images to a page, and sequentially repeating the providing and assigning until no further graphical images are available.

According to a fourth aspect of the present invention, there is provided method for assigning a number of graphical images to a plurality of pages based on desired appearance of at least one graphical image. The method comprises soliciting information from a user, the information comprising at least one from a group comprising size of a reference image, a viewing distance of the reference image, a desired final viewing distance, and a desired final image size, determining a desired final image size for the at least one image when not obtained from the information soliciting, and determining a number of graphical images per page based on at least one from a group comprising the page area, expected page coverage, and typical page coverage.

According to a fifth aspect of the present invention, there is provided a method for assigning a number of graphical images to a plurality of pages, the number of graphical images split into at least two chapters. The method comprises soliciting information from a user, the information comprising hard page breaks separating chapters and information sufficient to ascertain a desired number of pages, and assigning soft page breaks within chapters when the desired number of pages minus one minus the number of hard page breaks is greater than zero.

According to a sixth aspect of the present invention, there is provided a system for assigning a number of graphical images to a plurality of pages, the graphical images in the form of an image list. The system comprises a receiving element configured to receive the image list, a processor configured to receive the image list from the receiving element and automatically process the image list into multiple pages by dividing the image list according to predetermined criteria, and a display device capable of displaying the graphical images displayed on the multiple pages determined by the processor.

According to a seventh aspect of the present invention, there is provided a computer-readable storage medium containing a set of instructions for a device having a user interface and a display. The set of instructions comprise an input routine capable of receiving and processing information into an image list, a processing routine able to process the image list into multiple pages by dividing the image list according to predetermined criteria, and a display routine responsive to the processing routine for displaying graphical images on multiple pages as determined by the processing routine.

These and other objects and advantages of all aspects of the present invention will become apparent to those skilled in the art after having read the following detailed disclosure of the preferred embodiments illustrated in the following drawings.

DESCRIPTION OF THE DRAWINGS

The present invention is illustrated by way of example, and not by way of limitation, in the figures of the accompanying drawings in which.

DETAILED DESCRIPTION OF THE INVENTION

The present design includes an automatic pagination capability that enables a user to specify the look of an image arrangement, such as multiple images, photos, pictures, or the like, on a plurality of pages, either physical pages, slides, or computer representations of pages, based on desired properties specified by the user. The present design minimizes the risk of having an unusual number of images on one page with each of multiple pages having a different quantity of images, and allows for the user to specify desired appearance and sizing, desired number of pages, and/or hard or soft page breaks. The system may employ a page layout technique in certain embodiments, and may compute differences in pagination and seek to correct these differences based on the situation presented. In the present design, the input received comprises an ordered list of images, or image list, such as image1, image2, image3, . . . imageN. Images may appear in any order, and may be received at the time of capture in a computing environment. The image list may also include a series of hard page breaks, such as image1, image2, image3, image4, <BREAK1>, image5, image6, image7, image8, image9, image10, <BREAK2>, . . . A hard page break represents a flag in the image list indicating that a new page is required in the output before the next string of images. Hard page breaks enable the user to establish forced separations of the collection of images into a series of chapters. The list may include text elements, such as a title for the chapter or collection, or captions for the individual images. Text generally has no influence over the pagination of the images.

As used herein, the term "page" is used to refer to a group of images that simultaneously occupy an available region of space. In a printed photo album, a page is likely the face of one page in a book. In a slideshow, a page is one slide arranged on the screen at one time. On a computer, a page may be the viewable area on screen or the area including the entirety of the images presented. Further, as used herein, the term "user" may encompass a person or any entity requesting output from the design.

In all embodiments described herein, the user provides the image list, or list of images, along with certain other information, and the result is a sequence of positive integers, each positive integer representing the number of images on a single page in a sequence of one or more pages.

Figure 1A:
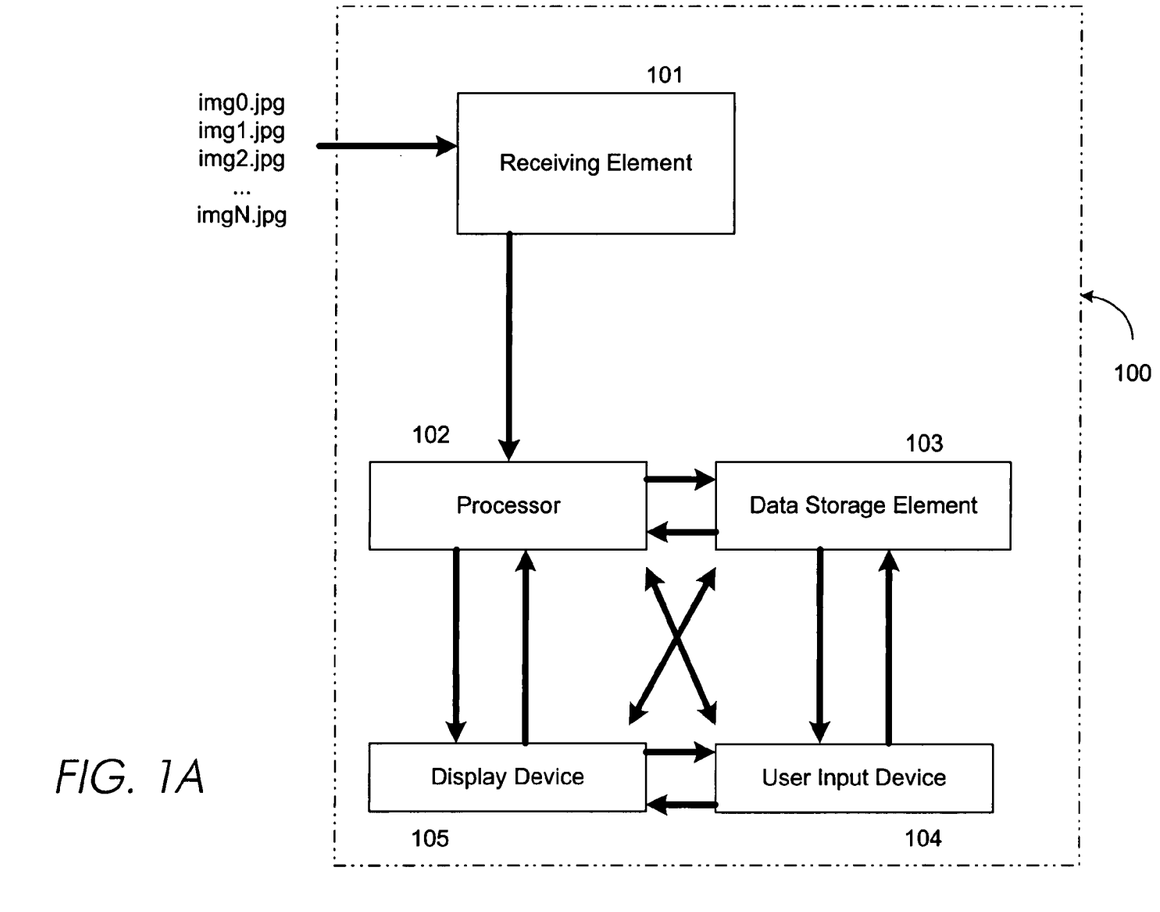
FIG. 1A illustrates an example of a system in accordance with an embodiment of the present design.

FIG. 1A illustrates one example of a system in accordance with the present design. From FIG. 1A, the system 100 receives the image list at receiving element 101. The receiving element may be any type of appropriate device able to receive a listing of images and certain other information, including but not limited to a modem or network interface mechanism or network device, or a scanning device and associated software, or other appropriate receiving mechanism. The receiving element 101 may convert graphical images, computer files, or other representations of graphical images into an image list in certain circumstances. The receiving element 101 passes the received image list to processor 102, which may obtain information from data storage element 103 and processes the image list into multiple pages by dividing the image list according to predetermined criteria. Data storage element 103 may include, but is not limited to, a computer hard drive. The processor 102 and/or data storage element 103 may receive user input via a user input device 104, which may include but is not limited to a mouse, keyboard, pointing device, or combination of input devices. When processing is completed by the processor 102 in accordance with the embodiments discussed below, the processor 102 either transmits or uses a sequence of positive integers, each positive integer representing the number of images on a single page in a sequence of one or more pages. The processor 102 may then employ the sequence of positive integers to divide the graphical images, and may employ a display device 105, including but not limited to a computer display or printing device, such as a printer.

In a first embodiment of the present invention, the user provides the image list and the number of pages in the output. The system first receives the ordered list of images including a number of images I, and subsequently determines the number of images per page Ni, equal to the number of images I divided by the specified number of pages P and rounded down. The number of images per page Ni is a base number of images per page, and a remainder could be distributed to the pages. For example, a listing of 26 images may be received, with five pages requested. The system then determines the number of images per page Ni is I/P, or 26/5, or 5.2, resulting in five pages of five images, with one additional image leftover. The system then divides the image list into five pages of five images and distributes the $26^{th}$ image to one of the five pages. This can be done either deterministically, such as on the first page or pages, last page or pages, or in some other relatively fixed manner, or randomly, such as by use of a random number generator, or by some other manner. In operation, the system computes a "remainder" R, equal to the number of images 1 minus the number of images per page Ni multiplied by the number of pages P. In the foregoing example, R is equal to I−(Ni*P), or 26 minus (5*5), or 1. The system then puts Ni images on (P minus R) pages, or five images on (5−1) or four pages in the foregoing example. On the remaining pages, the system puts (Ni plus one) images on R pages, or (5+1) or six images on one page, yielding pages of 5, 5, 5, 5, and 6 images. Any additional image(s) above Ni may be distributed deterministically or randomly.

As a second example, again assume 26 images are presented, but the user indicates a desire for three pages, resulting in eight images on each page, leaving two additional images. Again, distribution of these two additional images may be performed, such as distributing one image to the first page, then another image to the second page, thus filling the pages with all available images. The result may be three pages of eight images each with additional images on two of the pages, making three pages having nine, nine, and eight images on the three pages. As another example, 21 images may be presented, and the user may desire four pages of images. The system divides the images into three pages of five images per page and one page of six images per page.

The foregoing design is closed form and deterministic. In an alternate implementation, once the pages have been established with the desired number of images per page and any "leftover" images allocated to one or more pages, the user may be presented with the layout and simply approve or disapprove of the layout. If she disapproves of the layout, the process may be repeated with a varied output, namely providing excess images to different pages. Thus while the embodiment disclosed is deterministic and only requires that the user establish a number of pages in addition to the image list, other input may be solicited from the user and acted upon if desired.

Figure 1B:
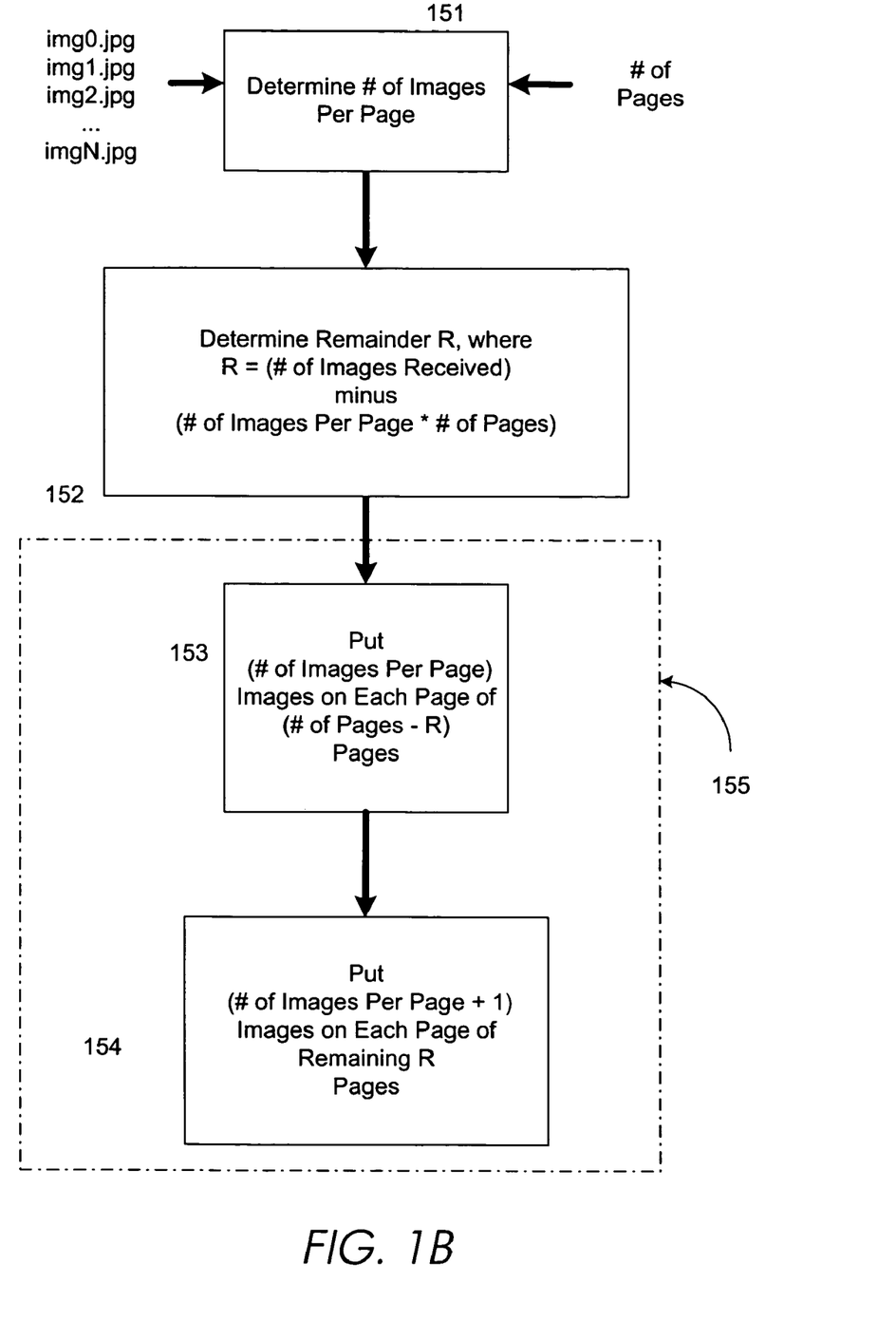
FIG. 1B illustrates a flowchart according to a first closed form pagination embodiment of the present invention.

A flowchart of this embodiment of the invention is illustrated in FIG. 1B. From FIG. 1B, the system receives the image list and the number of pages desired from the user. Point 151 determines a number of images per page by dividing the number of images by the number of pages desired and rounding down. Point 152 determines the remainder R as the number of images (I) minus the number of images per page (Ni) computed at point 151 multiplied by the number of pages provided by the user (P). Point 153 places Ni images on each of ((P minus R) pages, and point 154 places (Ni plus one) images on each of R pages, where the R pages having the additional images selected at points 153 and 154 may be determined randomly or deterministically. Point 155 indicates a specific embodiment of the design comprising allocating a first quantity of graphical images to each page of a first quantity of pages, such as is shown at point 153, and allocating a second quantity of graphical images, the second quantity of graphical images being one more image than the first quantity of graphical images, to each page of a second quantity of pages, such as is shown at point 154.

A second embodiment of the present invention allows the user to specify a desired number of images per page, or a desired maximum and minimum numbers of images per page. A user may supply a total number of images via the image list and a desired number of images per page, Ni. Alternately, the user may specify a minimum and maximum number of images per page, and Ni may be established according to the equation:

$$Ni = (\text{min specified} + \text{max specified})/2 \qquad (1)$$

As an example, a user may provide a quantity of images in an image list and specify six images per page, an Ni of six. Alternately, the user may provide a quantity of images in an image list and indicate the maximum number of images per page is eight, and the minimum is six, resulting in an Ni of seven from Equation (1). The actual number of images in the image list may be greater than Ni. If so, the system establishes the number of pages P by rounding the quotient of the number of images divided by Ni. In the example of the Ni of six, if 31 images are presented in the image list, 31 divided by six is 5.166, which rounds to five, making P equal to five. Alternately, 33 images with an Ni of five results in a quotient of 6.6, which rounds to seven, resulting in seven pages. The system then computes an adjusted number of images per page, denoted Ni', based on the total number of pages P. This adjusted number of images per page is the rounded value of the number of photos divided by the previously computed P, or number of pages. In general, Ni' may or may not be equal in value to Ni. In the foregoing example, 31 images divided by a P of five yields 6.1, which rounds to an adjusted number of photos per page of six. The system then computes a "remainder" R as a difference between the number of photos and the value of the adjusted number of photos per page multiplied by P. From the foregoing example of 31 images, Ni of six, P of five, and adjusted number of images per page Ni' of six, the remainder R is 31−(P*(Ni')), or 31 minus five multiplied by six, or 31 minus thirty, a remainder R of one. If the remainder R is less than zero, then the system assigns the adjusted number of images per page minus one to each of (−R) pages. If the remainder R is greater than zero, the system assigns the adjusted number of images per page plus one to each of R pages. If the remainder R is zero the system assigns the adjusted number of images per page to every page. In the foregoing example, with 31 images, P equal to 5, an adjusted number of images per page of six and an R of one, the system assigns seven images to one page and six images to each of the other 4 pages.

Figure 2:
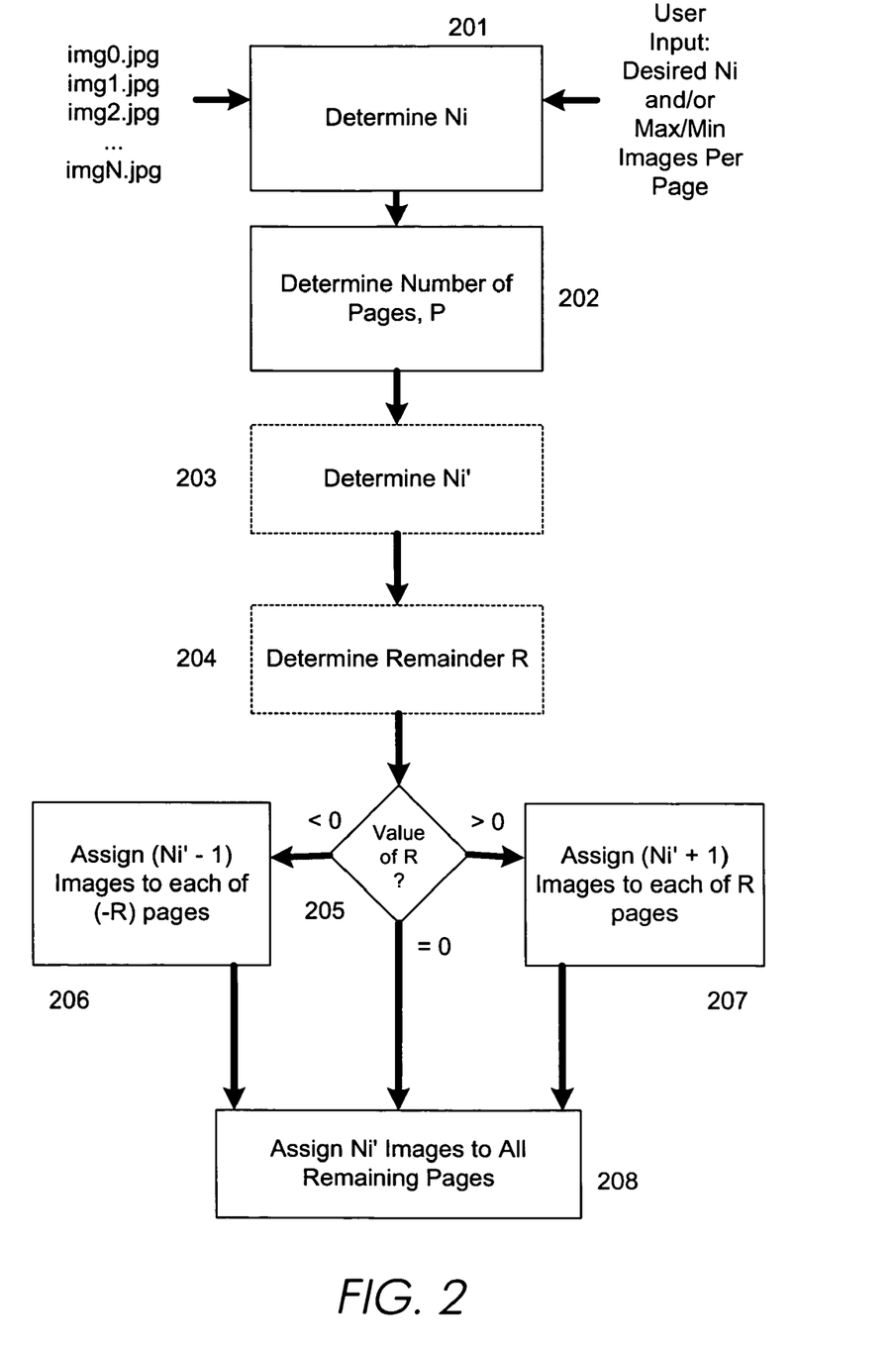
FIG. 2 is a flowchart according to an alternate closed form pagination embodiment of the present invention.

An illustration of this embodiment of the invention is presented in FIG. 2. From FIG. 2, the system receives the image list and input from the user regarding desired number of images per page, Ni, or the maximum and minimum number of images per page. If appropriate, point 201 transforms the maximum and minimum into an Ni value, such as by using Equation (1). Point 202 determines the number of pages, P, while point 203 determines the adjusted number of images per page, Ni'. As stated above, Ni' may or may not have a value equal to Ni. Point 204 determines the remainder R. Point 205 determines whether R is greater than or less than or equal to zero, and points 206 and 207 assign images based on the value of R. Point 208 assigns Ni' images to all remaining pages.

Another example of this implementation is a user request of 10 images per page and 32 images total. Previous systems would typically offer an arrangement of four pages, individually containing 10, 10, 10, and 2 images. The present design, as shown in FIG. 2, has an Ni of 10, number of pages 32/10 rounded to three, and a Ni' of 10.667 rounded to 11. Remainder would be 32 minus three times eleven, or 32 minus 33, resulting in a remainder of −1. The system then provides the adjusted number of images per page minus one, or eleven minus one equal to ten, images to (−R) pages, or to one page. The result is image assignments of 11, 11, and 10 images on each of the three pages, as an example distribution.

A third embodiment of the present invention specifies pagination based on minimum and maximum images per page and offers the user increased flexibility in deciding the ultimate layout of the images. This third embodiment utilizes the page layout technique, wherein images are received and presented on the page in a desirable manner, such as the page layout techniques presented in currently co-pending U.S. patent application Ser. Nos. 10/675,724, "Automatic Photo Album Page Layout", inventor C. Brian Atkins, and 10/675,823, "Single Pass Automatic Photo Album Page Layout", inventor C. Brian Atkins, both filed on Sep. 30, 2003, and assigned to the assignee of the present application. Other page layout techniques may be employed. A typical page layout technique may offer a scoring for candidate layouts, wherein a lower or higher score indicates a better layout. The term "better" layout is subjective, but in one instance a better layout would be one which reduces the amount of white or blank space on the page. The result may therefore be a score associated with a candidate or final layout. User input may guide the page layout technique, such as a user desiring that image 1 must be more prominent and larger on the page than images 2, 3, and 4.

Initially, the user specifies a minimum and maximum number of images per page. The system positions a marker at the start of the list of input images. The system may then employ any available page layout technique or program to generate a page layout for each permissible number of images per page, with each page layout including the image at the marker and the computed number of consecutive images. The system determines the number of images for the current page as the number of images on the page layout having the best score. The system then advances the marker down to the next available image and repeats the foregoing procedure. If at any point, the remaining number of images is less than the minimum allowable images per page, then the layout algorithm generates a final page using the remaining images.

For example, an image list may include 17 images and the user may specify between 1 and 4 images per page. In this instance, depending upon the desires of the user and, for example, the aspect ratios of the images, the present embodiment may utilize a page layout technique and resultant scoring to generate the following sequence of photos per page: 3, 4, 1, 2, 3, 2, 2. The layout for each page may therefore be selected because it had a better score than other candidate layouts using the same or different sets of images.

Figure 3:
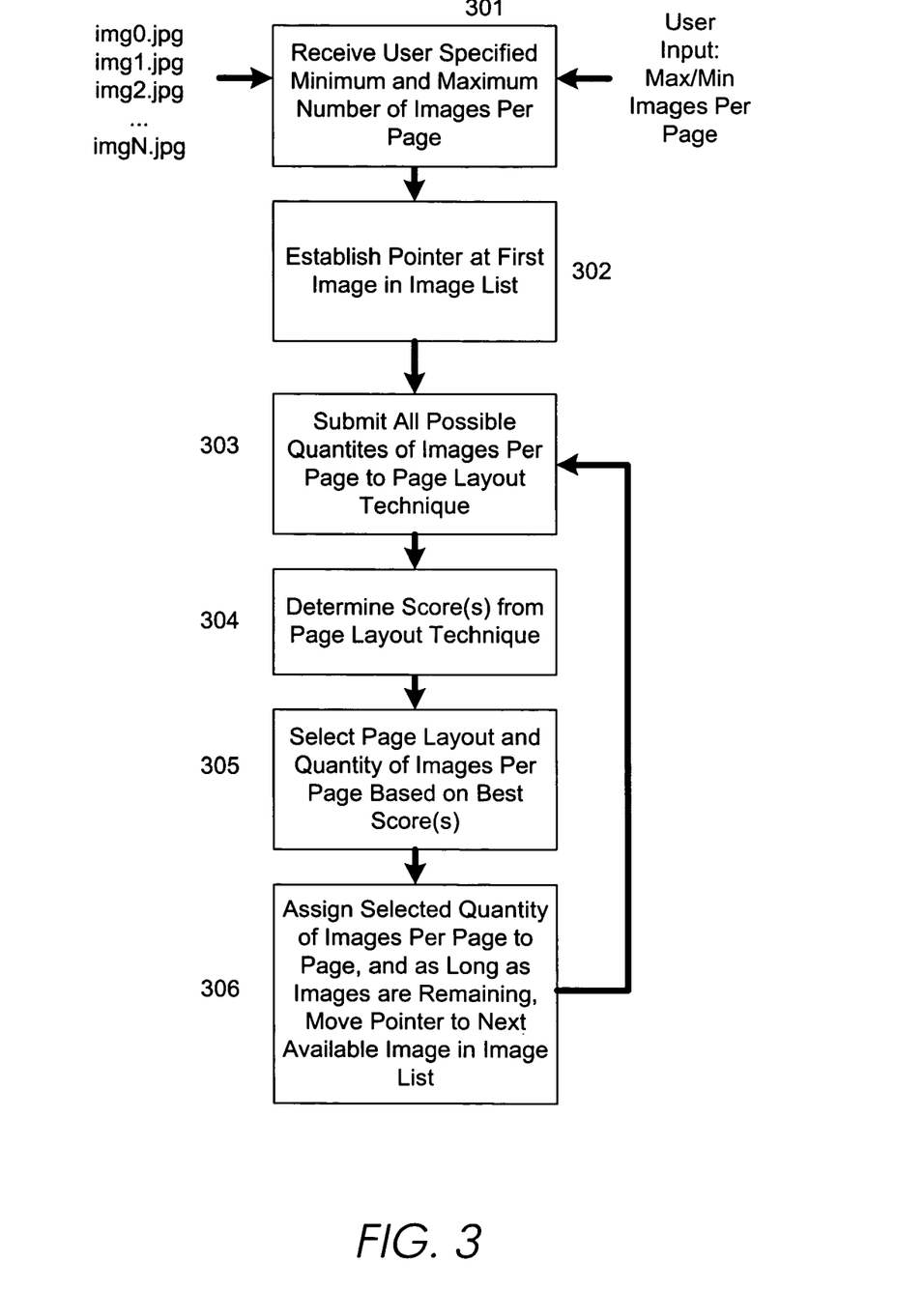
FIG. 3 shows a flowchart according to a third embodiment of the present invention using image pointers.

FIG. 3 illustrates one design of this third embodiment of the invention. From FIG. 3, point 301 calls for the user to specify the minimum and maximum number of images per page. Point 302 establishes the pointer at the first image in the received image list. Point 303 submits all possible quantities, from minimum to maximum as specified by the user in point 301, to the page layout technique. Point 304 determines a score for each possible quantity using the page layout technique, and point 305 selects the page layout and quantity of images having the best score from point 304. Point 306 moves the pointer to the next available image, and the process repeats as shown until no further images are available.

A fourth embodiment of the present invention specifies pagination under expected viewing conditions. For example, a user may desire that images occupy approximately the same area as a four inch by six inch photo print. The user may alternately specify that she would like the image or images to appear, when viewed from ten feet away, as a four by six inch photo would appear when viewed at an average arm's length, so that particular details of the image may be appreciated.

In operation, information provided by the user may vary, but typically may include at least the size of a reference image, a viewing distance of the reference image, and a desired final viewing distance. The system has available desired page size, such as a 24 inch by 36 inch poster, and determines a desired image size based on the input received. Again, input received may vary, but may include the reference image size, reference viewing distance, desired actual viewing distance, and other relevant information. For example, the user may specify that each image should take up approximately the same area as a four inch by six inch print, where such specification obviates the need for providing a reference image size or reference viewing distance. The system may employ geometry or trigonometry to determine desired photo size from a specified set of viewing parameters or conditions.

The system then determines a number of images per page from the computed desired image size and any additional inputs received, such as the desired page size and an expected or average page coverage. The system then employs the distribution or pagination method of the second embodiment discussed above to place images on pages.

For example, a user may specify printing a large photo collection on 36 inch by 48 inch posters, with photos having the visible resolution and quality of a four inch by six inch photo viewed from one foot away when viewed at an observation distance of four feet. The user may not wish to determine the number of pages required for the photo collection. The system uses simple geometry in this case to determine that the desired image size is 16 inches by 24 inches, or generally that the average image in the output should have an area equal to the area of a 16-inch by 24-inch print. Continuing with the example, the system then incorporates an expectation that in the output layout, approximately 90% of each page will be covered by photo. Taking all this information into account, the system determines a number of images per page as follows. The page area is 36 by 48 inches, or 1728 square inches; the expected area of photos covering an arbitrary page will be 90 percent of 1728 square inches, or 1555 square inches; and the desired image size is 16*24 or 384 square inches. Thus the number of photos placed on each page is round (1555/384) or four images per page. The system then submits the image list, along with an input number of images per page, Ni equal to four in this example, to program functionality implementing the second embodiment described above.

As described above, the system therefore accounts for expected or typical page coverage and the page area, and determines the number of images per page, an integer value. The system may then use an image distribution method, such as the method of the second embodiment described above, to arrive at a final pagination result.

Figure 4:
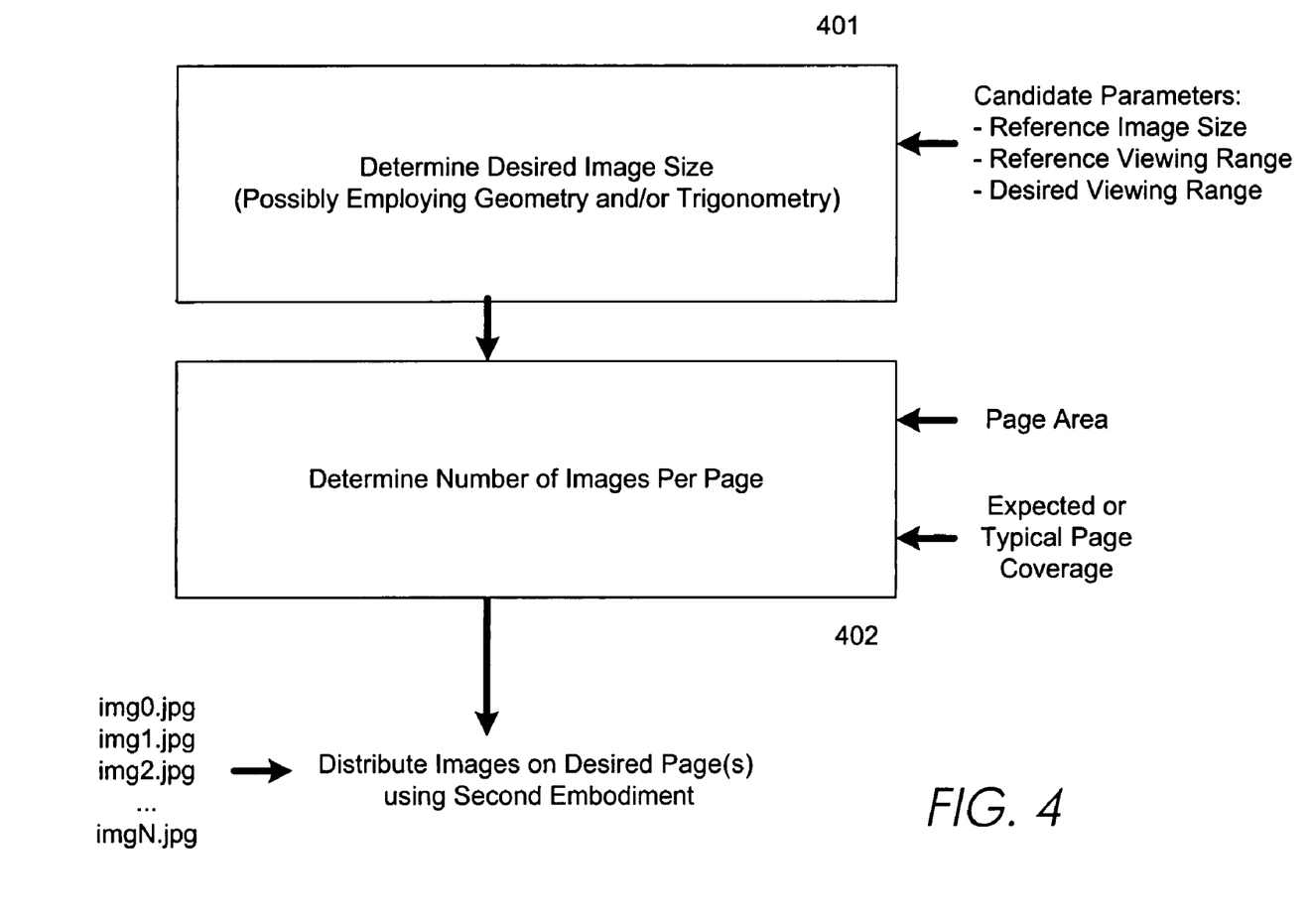
FIG. 4 is a flowchart according to a fourth perspective sizing embodiment of the present invention.

FIG. 4 illustrates one aspect of this fourth embodiment of the invention. From FIG. 4, the input provided may be in varying forms, including but not limited to reference image size, reference image viewing distance, and desired viewing range. Not all of these parameters must be specified by the user, and in certain circumstances other parameters may be specified, such as a maximum or minimum number of images per page, or a desired image size, such as the area of a 4 by 6 inch image. Based on the parameters presented, the system takes the specified parameters at point 401 and determines the desired image size, optionally employing geometry or trigonometry if needed. This desired image size, along with the expected or typical page coverage, and available or selected page area, are provided to point 402, which determines the number of images per page. With the number of images per page, and the image list, the design of the second embodiment discussed above may be employed to distribute the images among the pages.

A fifth embodiment of the present invention enables the user to force hard page breaks and may take the form of one of two general cases. In the first case, the user may specify the desired number of images per page, the image list, and the hard page breaks or chapters, where the number of hard page breaks is one less than the number of chapters. As used herein, the term chapters refers to a collection of at least one page, in certain cases related in some way by the user. A set of vacation photos may be one chapter, high school graduation a second chapter, and a family outing a third chapter. From the foregoing correlation between chapters and hard page breaks, as an example, six hard page breaks is equal to seven chapters. With the number of images, the hard page breaks, and the number of images per page, the system uses the second embodiment, discussed above, to allocate images separately in each chapter.

As an example of the first case, the user may provide two chapters (separated by one hard page break), where the first chapter has 12 photos and the second chapter has 14 photos, and the user may request the output have 3 photos on each page. Paginating the first chapter by embodiment 2 results in a sequence of photos per page of 3,3,3,3. Paginating the second chapter by embodiment 2 results in 3, 3, 3, 3, 2. Therefore the output sequence of photos per page would be 3,3,3,3|3,3,3,3,2 where "|" is the hard page break.

In the second case, the system may allow the user to establish the desired number of pages of output, resulting in a series of chapters of pages, with chapters separated by hard page breaks and images per page divided among chapters using soft page breaks. If the user specifies the number of pages of output, P is the requested number of pages. B, equal to P minus one, represents the number of total page breaks, so for a user specifying ten pages as P, B is equal to nine, or a total of nine page breaks requested. R is the number of hard page breaks, where hard page breaks separate chapters. The number of soft page breaks, S, equals P minus one minus R, or B minus R. If S is less than zero, this indicates an error, and revised parameters are required. If S is equal to zero, this represents the trivial solution, where the number of hard page breaks is appropriate for the number of pages, and simple allocation of images between chapters is all that is required.

If S is greater than zero, the system may assign (B minus R) soft page breaks in order to establish the desired number of total page breaks. The system may then assign soft page breaks sequentially, where assigning each soft page is performed in a predetermined manner, such as by minimizing the variation in the number of images per page. The largest number of images on any one page in the collection minus the smallest number of images on any one page may be minimized in this aspect of the design.

As an example, a user may provide 14 images of a party and 27 images of a vacation and specify that the output should fit on five pages. The present aspect of the design decides where to place the four page breaks in the 41 image collection, which contains two chapters. From the foregoing, P in this example is five, and B is four, and the number of hard page breaks, R, is one. One page break is established between chapters, and the system must establish the (P minus one minus R), or three, remaining page breaks.

One way of looking at the division of images between chapters and the establishment of soft page breaks is as follows. After evaluating for the trivial solution or an incorrect parameter specification based on the value of S, the system takes one soft page break from the remaining soft page breaks. For each chapter, the system uses the first embodiment, discussed above, to tentatively allocate images among the pages of the chapter, essentially assuming the chapter receives the soft page break. Any chapter that has as many photos as one more than the number of soft page breaks previously assigned to the chapter may not be considered a candidate to receive the current soft page break. The system assigns the soft page break to one of the available chapters such that the maximum number of images per page minus the minimum number of images per page, across the entire output, not just within the chapter, is minimized. If any soft page breaks are left, the system cycles through the foregoing again, but if not, all soft page breaks have been allocated, and the system stops.

In an alternate embodiment for allocating soft page breaks, using the two chapter 27 and 14 image example, the system determines the ratio of images in each chapter, 27 to 14, to be 1.928, or approximately 2, and thus twice as many page breaks belong in the chapter of 27 images than in the chapter of 14 images, resulting in two page breaks designated for the 27 image chapter and one page break for the 14 page chapter. Simple division, such as that shown in the first embodiment discussed above, results in pages of 9, 9, and 9 images each and pages of 7 and 7 for the two chapters. The system thus divides the images to balance the quantity of images on all pages.

Figure 5:
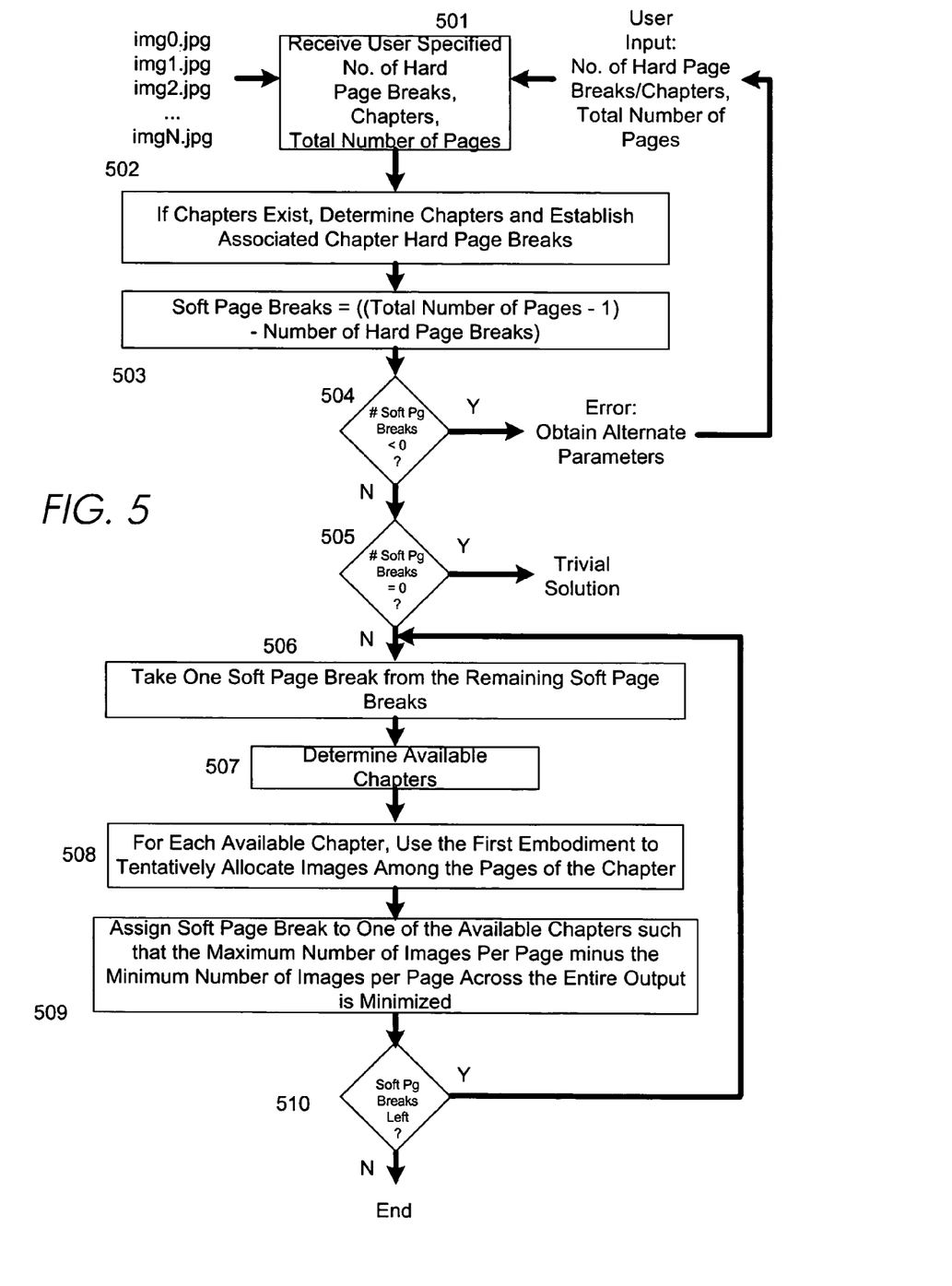
FIG. 5 represents a flowchart according to a fifth hard page break/soft page break embodiment of the present invention.

FIG. 5 illustrates performance of the present embodiment of this second case of the invention. From FIG. 5, the user provides the image list indicating a number of images and specifies the number of hard page breaks, equal to the number of chapters minus one, and may specify the total number of pages at point 501. Point 502 determines the number of images in each chapter, and establishes hard page breaks between chapters. Point 503 subtracts the number of total pages desired minus one to obtain a total number of page breaks, and the total number of page breaks minus the number of hard page breaks establishes the desired number of soft page breaks. Point 504 determines whether the number of soft page breaks is less than zero, and if so, requests alternate parameters from the user. Point 505 determines whether S is equal to zero, the trivial solution where the number of hard page breaks is one less than the desired number of pages, and performs the trivial solution of allocating images to the pages.

After evaluating for the trivial solution or an incorrect parameter specification, the system takes one soft page break from the remaining soft page breaks at point 506. At point 507, the system determines available chapters by omitting any chapter having as many photos as one more than the number of soft page breaks previously assigned to the chapter. At point 508, for each available chapter, the system uses the first embodiment to tentatively allocate images among the pages of the chapter. At point 509, the system assigns the soft page break to one of the available chapters such that the maximum number of images per page minus the minimum number of images per page, across the entire output, is minimized. At point 510, if any soft page breaks are left, the system cycles through points 506 through 510 again, but if not, all soft page breaks have been allocated, and the system stops.

It will be appreciated to those of skill in the art that the present design may be applied to other systems that perform efficient separation functions for groups of items, including scalable or alterable objects that can vary in size. In particular, it will be appreciated that various types of list dividing functions may be addressed by the aspects described herein.

Although there has been herein above described a method and for performing pagination for multiple images in an image list, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method for assigning a total quantity of graphical images in an image list to a total quantity of pages, comprising:

receiving user input including the graphical images and the total quantity of pages;

allocating a first quantity of graphical images to each page of a first quantity of pages, wherein the allocating a first quantity of graphical images includes determining a number of graphical images per page by dividing the total quantity of graphical images by the total quantity of pages input by the user and rounding down; and determining a remainder of the first quantity of graphical images by determining an integer value equal to the total quantity of graphical images minus the number of graphical images per page multiplied by the total quantity of pages and allocating the first quantity of graphical images to the first quantity of pages, wherein the first quantity of pages is equal to the total quantity of pages minus the integer value; and allocating a second quantity of graphical images, the second quantity of graphical images being one more image than the first quantity of graphical images, to each page of a second quantity of pages, such that the remainder of the first quantity of graphical images are automatically distributed to the second quantity of pages in response to a user providing only the graphical images and the total quantity of pages as input.

2. The method of claim 1, wherein the page represents one from a group including a page from a photo album, a slide from a slideshow, and an arrangement of space on a computer screen.

3. The method of claim 1, wherein the user specifies the total quantity of pages by establishing a minimum and maximum number of images per page, and wherein specifying the quantity of pages comprises averaging the minimum and maximum number of images per page.

4. The method of claim 1, wherein said allocating the second quantity of images comprises assigning the second quantity of images to random pages.

5. The method of claim 1, wherein said allocating the second quantity of images comprises assigning the second quantity of images to pages in a predetermined manner.

6. A method of assigning graphical images to a plurality of pages using an image list and a desired number of graphical images per page as input comprising:

enabling a user to establish the desired number of graphical images per page for the image list, wherein the image list comprises a quantity of graphical images;

determining a number of pages, wherein determining a number of pages includes, dividing the quantity of graphical images in the image list by the desired number of graphical images per page input by the user;

determining an adjusted number of graphical images per page using the number of pages;

determining a remainder representing a difference between the quantity of graphical images and the adjusted number of graphical images per page multiplied by the number of pages; and assigning a remaining number of graphical images per page to each of a final quantity of pages, the remaining number of graphical images per page based on the adjusted number of graphical images per page and rim final quantity of pages based on the remainder, wherein assigning a remaining number of graphical images per page further includes, in response to the remaining number of graphical images being greater than zero, assigning the adjusted number of images per page plus one to each of the pages until all remaining graphical images are assigned to a page, in response to the remaining number of graphical images being less than zero assigning the adjusted number of images per page minus one for each of the negative remaining images, such that all of the graphical images in the image list are automatically assigned to one of the final quantity of pages using only the image list and the desired number of graphical images per page as input provided by the user.

7. The method of claim 6, wherein said assigning comprises distributing the remaining quantity of graphical images among the final quantity of pages in a random manner.

8. The method of claim 6, wherein said assigning comprises distributing the remaining quantity of graphical images among the final quantity of pages in a predetermined manner.

9. The method of claim 6, wherein the page represents one from a group including a page from a photo album, a slide from a slideshow, and an arrangement of space on a computer screen.

10. The method of claim 6, wherein the enabling allows the user to specify a desired quantity of graphical images per page by establishing a minimum and maximum number of graphical images per page, and wherein specifying the quantity of graphical images per page comprises averaging the minimum and maximum number of graphical images per page.

11. The method of claim 6, wherein the assigning comprises assigning graphical images equal to the adjusted number of graphical images per page minus one to each of −1 multiplied by the remainder quantity of pages.

12. The method of claim 6, wherein the assigning comprises assigning graphical images equal to the adjusted number of graphical images per page plus one to each of the remainder quantity of pages.

13. A method for assigning a number of graphical images to a plurality of pages, comprising:

establishing said desired number of graphical images per page by receiving input from a user, wherein the user input includes the graphical images and a total quantity of paces and, wherein said desired number of graphical images per page represents a range of desired graphical images per page and is determined by dividing a total quantity of the graphical images by the total quantity of pages input by the user;

providing each possible quantity of graphical images equal to the desired range of graphical images per page to a page layout technique having a scoring functionality, said page layout technique determining a best scare arrangement of graphical images, said best score arrangement of graphical images equating to a desired page layout of a first quantity of graphical images;

assigning the first quantity of graphical images from the number of graphical images to a page based on the desired page layout according to said best score arrangement of the first quantity of graphical images and the desired number of graphical images per page determined from the input received from the user; and sequentially repeating said providing and assigning until no further graphical images are available, such that all of the graphical images are automatically assigned to a page using only the graphical images and the desired number of graphical images per page as input provided by the user.

14. The method of claim 13, wherein said establishing comprises soliciting a value from a user, said value from the user corresponding to the desired number of graphical images page.

15. The method of claim 13, wherein said establishing comprises soliciting a maximum and minimum quantity of graphical images per page from a user, thus representing the range of desired graphical images per page.

16. The method of claim 13, wherein the page represents one from a group including a page from a photo album, a slide from a slideshow, and an arrangement of space on a computer screen.

17. The method of claim 15, wherein said providing comprises:

providing a first quantity of graphical images according to a lowest value in the range to the page layout technique, and the page layout technique establishing a first layout and associated first score;

providing at least one intermediate quantity of graphical images according to a middle value in the range to the page layout technique, and the page layout technique establishing at least one middle layout and at least one associated middle score;

providing a last quantity of graphical images according to a highest value in the range to the page layout technique, and the page layout technique establishing a highest layout and associated highest score; and selecting a best layout based on a best score from among the first layout, at least one middle layout, and highest layout and associated first scare, at least one middle score, and highest score.

18. A method for automatically assigning a number of graphical images to a plurality of pages based on a desired appearance of a reference image among at least one graphical image, comprising:

receiving user input wherein the user input includes the graphical images and a total quantity of pages;

determining a desired number of graphical images per page by dividing a total quantity of the graphical images by the total quantity of pages input by the user;

soliciting information about the desired appearance of the reference image among the at least one graphical image from a user, the information comprising at least one from a group comprising a size of the reference image, a viewing distance of the reference image, a desired final viewing distance, and a desired final image size;

receiving the information about the desired appearance of the reference image of the at least one graphical image from the user;

determining a desired final image size for the reference image of the at least one graphical image by using geometry to compute final image size of the reference image of the at least one graphical image in accordance with die information received from the user;

determining a number of graphical images per page based on the computed final image size of reference image of the at least one graphical image, the determined desired number of graphical images per page, and at least one from a group comprising the page area, expected page coverage, and typical page coverage; and automatically placing all of the number of graphical images to a plurality of pages using the information received about the desired appearance of the reference image of the at least one graphical image us the only input from the user.

19. The method of claim 18, wherein computing the desired final image size comprises employing geometry or trigonometry to equate final image size in accordance with desired viewing range.

20. The method of claim 19, further comprising after said computing the number of graphical images per page:
   determining a number of pages and computing an adjusted number of graphical images per page using the number of pages;
   determining a remainder representing a difference between the quantity of graphical images and the adjusted number of graphical images per page multiplied by the number of pages; and
   assigning a remaining number of graphical images per page to each of a final quantity of pages, the remaining number of graphical images per page based on the adjusted number of graphical images per page and the final quantity of pages based on the remainder.

21. The method of claim 18, wherein the page represents one from a group including a page from a photo album, a slide from a slideshow, and an arrangement of space on a computer screen.

22. A system for assigning a number of graphical images to a plurality of pages, said graphical images in the form of an image list, comprising:
   a receiving element configured to receive the image list and user input, wherein the user input includes a total quantity of a desired number of pages;
   a processor configured to receive the image list and the user input from the receiving element and automatically process the image list into multiple pages by dividing the image list according to predetermined criteria, wherein die predetermined criteria is solicited and received from a user and includes bard page breaks separating chapters and a the total quantity of the desired number of pages and wherein, the processor is further configured to assign soft page breaks within chapters when the desired number of pages minus one minus the number of hard page breaks is greater than zero; and
   a display device capable of displaying the graphical images displayed on the multiple pages determined by the processor.

23. The system of claim 22, said processor having an ability to operate according to instructions comprising:
   allocating a first quantity of graphical images to each page of a first quantity of pages; and
   allocating a second quantity of graphical images, the second quantity of graphical images being one more image than the first quantity of graphical images, to each page of a second quantity of pages.

24. The system of claim 22, said processor having an ability to operate according to instructions comprising:
   enabling a user to establish a desired number of graphical images per page for the image list comprising a quantity of graphical images;
   determining a number of pages;
   determining an adjusted number of graphical images per page using the number of pages;
   determining a remainder representing a difference between the quantity of graphical images and the adjusted number of graphical images per page multiplied by the number of pages; and
   assigning a remaining number of graphical images per page to each of a final quantity of pages, the remaining number of graphical images per page based on the adjusted number of graphical images per page and the final quantity of pages based on the remainder.

25. The system of claim 22, said processor having an ability to operate according to instructions comprising:
   establishing a desired number graphical images per page, wherein said desired number of graphical images per page may represent a range of desired graphical images per page;
   providing a quantity of graphical images equal to the desired number of graphical images per page to a page layout technique having a scoring functionality, said page layout technique determining a best score arrangement of graphical images, said best score arrangement of graphical images equating to a desired page layout of a first quantity of graphical images;
   assigning the first quantity of graphical images from the number of graphical images to a pages; and
   sequentially repeating said providing and assigning until no further graphical images are available.

26. The system of claim 22, said processor having an ability to operate according to instructions comprising:
   soliciting information from a user, the information comprising at least one from a group comprising size of a reference image, a viewing distance of the reference image, a desired final viewing distance, and a desired final image size;
   determining a desired final image size for the at least one image when not obtained from said information soliciting; and
   determining a number of graphical images per page based on at least one from a group comprising the page area, expected page coverage, and typical page coverage.

27. A computer-readable storage medium containing a set of instructions for assigning a total quantity of graphical images in an image list to a total quantity of pages, the set of instructions comprising:
   receiving user input including the graphical images and the total quantity of pages;
   allocating a first quantity of graphical images to each page of a first quantity of pages, wherein the allocating a first quantity of graphical images includes
      determining a number of graphical images per page by dividing the totalquantity of graphical images by the total quantity of pages input by the user and rounding down; and
      determining a remainder of the first quantity of graphical images by determining an integer value equal to the total quantity of graphical images minus the number of graphical images per page multiplied by the total quantity of pages and allocating the first quantity of graphical images to the first quantity of pages, wherein the first quantity of pages is equal to the total quantity of pages minus the integer value; and
   allocating a second quantity of graphical images, the second quantity of graphical images being one more image than the first quantity of graphical images, to each page a second quantity of pages, such that the remainder of the first quantity of graphical images are automatically distributed to the second quantity of pages in response to a user providing only the graphical images and the total quantity of pages as input.

28. The computer-readable storage medium of claim 27, said processing routine having an ability to operate according to instructions comprising:
   allocating a first quantity of graphical images to each page of a first quantity of pages; and allocating a second quantity of graphical images, the second quantity of graphical images being one more image than the first quantity of graphical images, to each page of a second quantity of pages.

29. The computer-readable storage medium of claim 27, said processing routine having an ability to operate according to instructions comprising:

enabling a user to establish a desired number of graphical images per page for the image list comprising a quantity of graphical images;

determining a number of pages;

determining an adjusted number of graphical images per page using the number of pages;

determining a remainder representing a difference between the quantity of graphical images and the adjusted number of graphical images per page multiplied by the number of pages; and assigning a remaining number of graphical images per page to each of a final quantity of pages, the remaining number of graphical images per page based on the adjusted number of graphical images per page and the final quantity of pages based on the remainder.

30. The computer-readable storage medium of claim 27, said processing routine having an ability to operate according to instructions comprising:

establishing a desired number of graphical images per page, wherein said desired number of graphical images per page may represent a range of desired graphical images per page;

providing a quantity of graphical images equal to the desired number of graphical images per page to a page layout technique having a scoring functionality, said page layout technique determining a best score arrangement of graphical images, said best score arrangement of graphical images equating to a desired page layout of a first quantity of graphical images;

assigning the first quantity of graphical images from the number of graphical images to a page; and sequentially repeating said providing and assigning until no further graphical images are available.

31. The computer-readable storage medium of claim 27, said processing routine having an ability to operate according to instructions comprising:

soliciting information from a user, the information comprising at least one from a group comprising size of a reference image, a viewing distance of the reference image, a desired final viewing distance, and a desired final image size;

determining a desired final image size for to at least one image when not obtained from said information soliciting; and determining a number of graphical images per page based on at least one from a group comprising the page area, expected page coverage, and typical page coverage.

32. The computer-readable storage medium of claim 27, said processing routine having an ability to operate according to instructions comprising:

soliciting information from a user, the information comprising hard page breaks separating chapters and information sufficient to ascertain a desired number of pages; and assigning soft page breaks within chapters when the desired number of pages minus one minus the number of hard page breaks is greater than zero.

* * * * *

UNITED STATES PATENT AND TRADEMARK OFFICE
CERTIFICATE OF CORRECTION

PATENT NO. : 7,296,224 B2
APPLICATION NO. : 10/831436
DATED : November 13, 2007
INVENTOR(S) : C. Brian Atkins et al.

It is certified that error appears in the above-identified patent and that said Letters Patent is hereby corrected as shown below:

Column 12, line 45, in Claim 6, after "input" insert -- , --.

Column 12, line 50, in Claim 6, after "includes" delete ",".

Column 12, line 62, in Claim 6, delete "rim" and insert -- the --, therefor.

Column 13, line 44, in Claim 13, delete "paces" and insert -- pages --, therefor.

Column 13, line 53, in Claim 13, delete "scare" and insert -- score --, therefor.

Column 14, line 4, in Claim 14, after "images" insert -- per --.

Column 14, line 13, in Claim 17, delete "claim 15" and insert -- claim 13 --, therefor.

Column 14, line 31, in Claim 17, after "layout" insert -- , --.

Column 14, line 31, in Claim 17, delete "scare" and insert -- score --, therefor.

Column 14, line 37, in Claim 18, after "input" insert -- , --.

Column 14, line 56, in Claim 18, delete "die" and insert -- the --, therefor.

Column 14, line 66, in Claim 18, delete "us" and insert -- as --, therefor.

Column 15, line 26, in Claim 22, delete "clement" and insert -- element --, therefor.

Column 15, line 33, in Claim 22, delete "die" and insert -- the --, therefor.

Column 15, line 34, in Claim 22, delete "bard" and insert -- hard --, therefor.

Column 15, line 36, in Claim 22, after "and" delete "a".

Column 16, line 5, in Claim 25, after "number" insert -- of --.

Column 16, line 17, in Claim 25, delete "pages" and insert -- page --, therefor.

UNITED STATES PATENT AND TRADEMARK OFFICE
CERTIFICATE OF CORRECTION

PATENT NO. : 7,296,224 B2
APPLICATION NO. : 10/831436
DATED : November 13, 2007
INVENTOR(S) : C. Brian Atkins et al.

It is certified that error appears in the above-identified patent and that said Letters Patent is hereby corrected as shown below:

Column 16, line 58, in Claim 27, after "each page" insert -- of --.

Column 18, line 16, in Claim 31, delete "to" and insert -- the --, therefor.

Signed and Sealed this

Twentieth Day of May, 2008

JON W. DUDAS
*Director of the United States Patent and Trademark Office*